United States Patent [19]

Szekely

[11] 3,873,582

[45] Mar. 25, 1975

[54] PROCESS FOR ISOLATING AMINOANTHRAQUINONES

[75] Inventor: Istvan Szekely, Basel, Switzerland

[73] Assignee: Ciba-Geigy AG, Basel, Switzerland

[22] Filed: Mar. 5, 1973

[21] Appl. No.: 338,011

[30] Foreign Application Priority Data

Mar. 10, 1972 Switzerland.......................... 3548/72

[52] U.S. Cl. ............................................... 260/378
[51] Int. Cl. ........................................... C07c 97/12
[58] Field of Search ..................................... 260/378

[56] References Cited
UNITED STATES PATENTS
2,149,525    3/1939    Jenkins............................... 260/582

FOREIGN PATENTS OR APPLICATIONS
328,210    4/1930    United Kingdom .............. 260/582
1,132,931    7/1962    Germany ........................... 260/378
1,154,489    9/1963    Germany ........................... 260/378

OTHER PUBLICATIONS

Coffey, Chemistry and Industry, pp. 1068–1074, (1953).

Vogel, A Text-Book of Practical Organic Chemistry, 3rd ed., p. 151, (1956).

*Primary Examiner*—Lorraine A. Weinberger
*Assistant Examiner*—Patrick J. Hagan
*Attorney, Agent, or Firm*—Joseph G. Kolodny; Edward McC. Roberts; Prabodh I. Almaula

[57] ABSTRACT

The present invention relates to a process for the separation of mixture of aminoanthraquinones, wherein the amines are partitioned in a system of two liquid phases consisting of an acid, aqueous phase and an organic phase which is immiscible with water, the two phases are separated, and the amines are isolated therefrom.

10 Claims, No Drawings

PROCESS FOR ISOLATING AMINOANTHRAQUINONES

Mono- and diaminoanthraquinones are important starting materials in the manufacture of dyestuffs. For most purposes these amines are required in great purity.

For reasons of quality the most important basic product, the 1-aminoanthraquinone, is manufactured via anthraquinone-1-sulphonic acid, which in turn is manufactured by sulphonation of the anthraquinone with oleum in the presence of a mercury catalyst. Sulphonation is only effected to a limit of 50% in order to avoid disulphonation of the anthraquinone. The unreacted anthraquinone is afterwards isolated and used again as starting product. The use of mercury is undesirable on account of its toxicity and particularly because in this process it is scarcely possible to avoid mercury losses. There is therefore an urgent need for another large-scale industrial process for the manufacture of 1-aminoanthraquinone. It has hitherto not been possible in industry to succeed with the synthesis route via 1-nitroanthraquinone because the nitration of the anthraquinone proceeds too inhomogeneously, and there are no industrially applicable processes for separating the isomers (see S. Coffey, Chemistry and Industry 1953, 1068 ff.). The isolation procedures hitherto recommended (sublimation, distillation, crystallisation) either involve too heavy an expenditure or they are not effecient enough. Treatment of the nitroanthraquinone mixture with sodium sulphite solution according to German Patent 164292 also does not lead to a product of satisfactory quality and the yield is poor. The same is true of the methods for isolating the mixture of the corresponding aminoanthraquinone derivatives obtained from the nitroanthraquinone mixture by reduction. Methods of isolation which would enable the economical manufacture of 1-aminoanthraquinone, in contract to the traditional procedures, are unknown. The same applies to 2-aminoanthraquinone and to the diaminoanthraquionone derivatives.

The surprising discovery has now been made that 1-aminoanthraquinone and 2-aminoanthraquinone can be separated from each other without loss and up to any desired degree of purity by means of dissociative extraction, i.e. by partition between an organic solvent which is immiscible with water and an aqueous phase with a specific acid concentration. On the basis of this method it is also possible to separate satisfactorily diaminoanthraquinone derivatives from both the monoamino derivatives and the diaminoanthraquinone derivatives from one another. The invention therefore relates to a process for separating a mixture of aminoanthraquinones in a system of two liquid phases consisting of an acid aqueous phase and an organic solvent which is immiscible with water. Aqueous solutions of strong acids with a pH of less than 3 are preferred. The proton concentrations of the aqueous solution should be greater than 1 mole/l. Suitable solvents are ketones, in particular methyl isobutyl ketone, or optionally chlorinated or nitrated hydrocarbons, such as alkylated, chlorinated or nitrated aromatic substances, e.g. toluene, xylene, chlorobenzene, o-dichlorobenzene, 1,3,5-trichlorobenzene or nitrobenzene. Suitable acid aqueous phases are dilute hydrochloric acid, or, preferably, phosphoric or sulphuric acid.

The partition depends primarily on the acid concentration and the temperature. The dissociative extraction takes place in a temperature range in which the solubility of the products to be separated attains or exceeds a minimum level dictated by the economy of the process, i.e. above 60°C, but preferably at 100° to 200°C, optionally under excess pressure.

The aminoanthraquinones are obtained by reducing the mixture which occurs when anthraquinone is nitrated in nitric acid, and then dissolving out the aminoanthraquinones contained therein with about 60% sulphuric acid in order to isolate the anthraquinone which has remained unchanged during the nitration and which is insoluble in 60% sulphuric acid. The solution of aminoanthraquinones in sulphuric acid is then diluted to the acid content of about 20% to 50% suitable for the dissociative partition and then mixed with o-dichlorobenzene at about 100° to 160°C.

The extraction can be performed continuously or batchwise. In the latter case, it is possible to dissolve the amine mixture e.g. in an aqueous acid and to extract as often as required with one of the organic solvents mentioned herein, or to dissolve the amine mixture in one of the organic solvents mentioned herein and to extract with aqueous acid. The optionally combined extracts again contain mixtures of the products to be separated, but the percentage composition is not the same, in that certain components have been accumulated. They can be further resolved by re-extraction with the aqueous acid used of the same or changed composition or with the solvent used. From a mixture of $\alpha$- and $\beta$-aminoanthraquinone and diaminoanthraquinone it is possible to isolate in this way e.g. the $\alpha$-aminoanthraquinone dissolved in the organic phase in as high a degree of purity as desired. The diaminoanthraquinones and the $\beta$-aminoanthraquinone are present in the acid aqueous solution. The aminoanthraquinones can be isolated from these solutions by the conventional methods, such as evaporation, precipitation etc.

The continuous separation proceeds according to the same principle. Extraction columns with mixing and separating zones are used. Preferably the extraction takes place in a countercurrent. The individual factors which influence the separation (temperature, pressure, acid concentration, amount of the organic phase, mixing and separation times) are so coordinated that optimum performance of the apparatus used in the separation is achieved. In this way — and in using a sufficient number of mixing and separating zones — it is possible to obtain fractions which contain the individual aminoanthraquinones in any desired purity.

Since the isolation of the diaminoanthraquinone by the process according to the invention is automatically possible, a start can be made from nitrations in nitric acid which have a high degree of nitration. For example, it is possible to process mixtures satisfactorily which are nitrated 100% to 120%. The yield of aminoanthraquinone per nitration batch is thereby increased and the process becomes more economical.

If nitration is carried out in sulphuric acid, nitroanthraquinone mixtures of a different composition result which, after analogous reduction and isolation of the anthraquinone, still lead to the pure 1-aminoanthraquinone by means of dissociative extraction. In the dissociative extraction it is also possible to usw 25% sulphuric acid for these amine mixtures, according to the difference in their composition. If such a mixture is extracted with 40% sulphuric acid, an initial extraction with 25% sulphuric acid is nonetheless advantageous, because thereby the relatively large amount of diamines is isolated first.

The following examples illustrate the invention, the parts and percentages being by weight unless otherwise stated.

EXAMPLE 1

A mixture consisting of 3.6 parts of commercial 1-aminoanthraquinone (98% content) and 0.36 part of commercial 2-aminoanthraquinone (90% to 95%) is suspended in 300 parts of 25% aqueous sulphuric acid at 100°C and the suspension is mixed at the same temperature with 390 parts of o-dichlorobenzene. The two-phase system which forms after the aminoanthraquinone derivatives have dissolved is then separated and the lower organic layer is subsequently extracted anew 6 times with 300 parts of 25% sulphuric acid each time at the same temperature (exhaustive extraction). Afterwards the organic solution is evaporated. It contains 3.6 parts of a product which in gas chromatographic analysis contains 95.4% of 1-aminoanthraquinone and only 2.4% of 2-aminoanthraquinone.

The sulphuric acid extracts are combined and re-extracted 3 times with 55 parts of dichlorobenzene on each occasion at 100°C. The individual organic fractions contain the following amounts of substance with the indicated composition:

1st. extract — 0.26 part (82.5% 1-aminoanthraquinone and 13.4% 2-aminoanthraquinone)

2nd. extract — 0.08 part (72.6% 1-aminoanthraquinone and 23.4% 2-aminoanthraquinone)

3rd. extract — 0.02 part (41% 1-aminoanthraquinone and 56% 2-aminoanthraquinone).

EXAMPLE 2

A mixture of nitroanthraquinones and anthraquinone obtained by nitration of anthraquinone is reduced and the aminoanthraquinone mixture is separated from the anthraquinone by dissolving it in 60% hot sulphuric acid. A solution of 17.8 parts of aminoanthraquinones in 292 parts of 60% sulphuric acid obtained in this way is heated to 110°C, diluted with 145 parts of water so that the sulphuric acid concentration is still 40%, and mixed at 105°C with 650 parts of o-dichlorobenzene. The layers are separated and the upper organic layer is extracted 4 times with 50 parts of 40% sulphuric acid on each occasion at 105°C. The sulphuric acid solutions are diluted with water to 5% acid content, the precipitated product is filtered off at room temperature, washed neutral with water and dried in vacuo to constant weight. The organic solution is washed neutral and evaporated to dryness in vacuo. The individual solutions contain the amounts of substance indicated in the following Table and whose composition was determined by gas chromatography. The Roman numerals denote the following substances:

I = 1-aminoanthraquinone
II = 2-aminoanthraquinone
III = 1,4-diaminoanthraquinone
IV = 1,5-diaminoanthraquinone
V = anthraquinone.

TABLE

| Fraction | Amount of substance in parts by weight | Composition in % | | | | |
|---|---|---|---|---|---|---|
| | | I | II | III | IV | V |
| o-dichlorobenzene | 12,39 | 98,1 | 1,0 | — | 0,1 | 0,7 |
| sulphoric acid 1st. extract | 4,3 | 50,5 | 39,0 | 2,9 | 3,6 | 0,1 |
| sulphoric acid 2nd. extract | 0,35 | 56,8 | 39,0 | 1,2 | 1,6 | 0,1 |
| sulphoric acid 3rd. extract | 0,37 | 63,3 | 34,6 | 0,7 | 1,0 | — |
| sulphoric acid 4th. extract | 0,24 | 72,4 | 26,7 | 0,3 | 0,4 | — |
| sulphoric acid 5th. extract | 0,23 | 77,7 | 21,7 | 0,1 | 0,3 | 0,2 |

EXAMPLE 3

A mixture of 53 parts of 1-aminoanthraquinone (I) and 6 parts of 2-aminoanthraquinone (II) was taken up in 700 parts of o-dichlorobenzene and the solution was put into a glass autoclave. 100 parts of 40% sulphuric acid were added and the autoclave was sealed. The temperature was raised to 160°C while stirring until all was dissolved (pressure: 3 kg/cm$^2$). The layers were then separated. After isolation of the lower aqueous layer, 100 parts of 40% sulphuric acid were again added under pressure and the extraction was carried out at the same temperature and pressure. Extraction was performed 7 times in all in analogous manner. After analysis by gas chromatography the extracts contained the following amounts of substance:

| Extract No. | 1 | 2 | 3 | 4 | 5 | 6 | 7 | 1-7 |
|---|---|---|---|---|---|---|---|---|
| Content of (I) in parts | 2.08 | 2.00 | 1,90 | 1.85 | 1.77 | 1.70 | 1.60 | 12.90 |
| Content of (II) in parts | 2.14 | 1.40 | 0.88 | 0.57 | 0.37 | 0.24 | 0.15 | 5.75 |

40.2 parts of 99.3% 1-aminoanthraquinone were obtained from the dichlorobenzene layer after evaporation of the solvent.

EXAMPLE 4

The process as described in Example 3 was carried out, but extraction was performed only twice with 700 parts of 40% sulphuric acid each time.

| Extract No. | 1 | 2 | total 1+2 | dichlorobenzene residue |
|---|---|---|---|---|
| Content of (I) in parts | 11.83 | 9.80 | 21.63 | 31.30 |
| Content of (II) in parts | 4.77 | 0.98 | 5.75 | 0.24 |

31.54 parts of 99.2% 1-aminoanthraquinone were obtained from the dichlorobenzene.

EXAMPLE 5

88.0 parts of (I) and 9.0 parts of (II) were taken up in 440 parts of dichlorobenzene and the solution was extracted twice with 700 parts of 40% sulphuric each time in a glass autoclave (temperature 160°C, pressure 3 kg/cm$^2$). The following result was obtained after processing the individual layers:

| Extract No. | 1 | 2 | total 1+2 |
|---|---|---|---|
| Content of (I) in parts | 42.10 | 21.8 | 63.9 |
| Content of (II) in parts | 7.75 | 1.05 | 8.80 |

24.17 parts of a 99.3% 1-aminoanthraquinone were obtained from the dichlorobenzene layer.

EXAMPLE 6

Starting mixture as in Example 5. It was extracted 4 times: the first time with 700 parts and then 3 times with 100 parts of 40% sulphuric acid.

| Extract No. | 1 | 2 | 3 | 4 | total 1-4 |
|---|---|---|---|---|---|
| Content of (I) in parts | 42.10 | 3.80 | 2.65 | 2.30 | 50.85 |
| Content of (II) in in parts | 7.75 | 0.57 | 0.30 | 0.16 | 7.78 |

37.3 parts of a 99.5% 1-aminoanthraquinone were isolated from the dichlorobenzene layer.

EXAMPLE 7

A mixture of 88 parts of (I) and 12 parts of (II) was dissolved in 3000 parts of dichlorobenzene. The mixture was extracted once with 3000 parts of 70% phosphoric acid at 110°C and then 6 times with 300 parts on each occasion of phosphoric acid of the same strength.

According to analysis by gas chromatography the extracts contained the following amounts of substance:

| Extract No. | 1 | 2 | 3 | 4 | 5 | 6 | 7 | total 1-7 |
|---|---|---|---|---|---|---|---|---|
| Content of (I) in parts | 17.0 | 1.63 | 1.62 | 1.57 | 1.54 | 1.50 | 1.47 | 26.33 |
| Content of (II) in parts | 9.8 | 0.67 | 0.47 | 0.32 | 0.23 | 0.16 | 0.11 | 11.76 |

The organic layer was evaporated off to yield 61.2 parts of 1-aminoanthraquinone (99.6% content).

EXAMPLE 8

A mixture of 88 parts of (I) and 12 parts of (II) was heated to a temperature of 143°C in a mixture of 500 parts of nitrobenzene and 500 parts of 40% sulphuric acid in a glass autoclave (pressure 3.6 kg/cm$^2$). After isolation of the sulphuric acid layer the nitrobenzene layer was extracted under the same conditions 10 times with 200 parts of 40% sulphuric acid on each occasion.

The combined extracts yielded 62.3 parts of a mixture consisting of 11.8 parts of (II) and 50.5 parts of (I).

The extracted organic layer was distilled off to yield a residue of 36.8 parts of 99.5% 1-aminoanthraquinone.

EXAMPLE 9

4.8 parts of (I) and 0.5 part of (II) were dissolved in a glass autoclave in a mixture of 240 parts of methyl isobutyl ketone and 723 parts of 40% sulphuric acid at 132°C and 3.3 kg/cm$^2$ pressure. After isolation of the sulphuric acid layer the organic layer was extracted 7 times with 50 parts of 40% sulphuric acid on each occasion. A total of 2.2 parts of (I) in admixture with 0.5 part of (II) were obtained from the combined acid extracts. After evaporation of the solvent 2.6 parts of (I) with a content of 0.1% of (II), i.e. 2.6 parts of 99.1% 1-aminoanthraquinone were obtained from the organic phase.

EXAMPLE 10

A mixture of 40.8 parts of (I), 1.8 parts of (II) and 12.5 parts of (III+IV) was dissolved at 100°C in a mixture of 3960 parts of 25% sulphuric acid and 1380 parts of o-dichlorobenzene. The phases were mixed and then separated again. The lower, organic layer of this first separation was subsequently extracted 12 times with 250 parts of 25% sulphuric acid on each occasion at the same temperature. After the processing, the combined acid extracts yielded a mixture of 4.0 parts of (I), 1.2 parts of (II) and 12.2 parts of (III + IV), i.e. a total of 17.7. After the processing a total of 36.6 parts of 1-aminoanthraquinone with 1.1% of (II) and 0.7% of (III + IV) was isolated.

EXAMPLE 11

The mixture used in Example 10 was processed to the first separation as described therein. The organic layer was then extracted 10 times with 50 parts of 40% sulphuric acid on each occasion under the same conditions. The combined acid extracts yielded after the processing a mixture of 8.3 parts of (I), 1.6 parts of (II) and 12.5 parts of (III+IV). 31.6 parts of 99.5% (I) were isolated from the organic portion.

I claim:

1. A process for the separation of mixture of aminoanthraquinones which are mono- or di-aminated, wherein the amines are partitioned at a temperature above 60°C in a system of two liquid phases consisting of an acid, aqueous phase having a proton concentration greater than 1 mol/liter, and an organic phase which is immiscible with water, the two phases are separated, and the amines are isolated therefrom.

2. A process according to claim 1, wherein a phase system is used which consists of an optionally chlorinated or nitrated hydrocarbon or a ketone and an aqueous solution of an inorganic or organic acid with a pH of less than 3.

3. A process according to claim 1, wherein aqueous sulphuric acid or phosphoric acid and a chlorinated, nitrated or alkylated benzene derivative are used as phase system.

4. A process according to claim 1, wherein aqueous 20% to 60% sulphuric acid and o-dichlorobenzene, 1,3,5-trichlorobenzene or nitrobenzene are used as phase system.

5. A process according to claim 1, wherein the partition is carried out at 100° to 200°C and optionally under pressure.

6. A process according to claim 1, wherein 1-aminoanthraquinone is separated from 2-aminoanthraquinone and diaminoanthraquinones.

7. A process according to claim 1, wherein a mixture dissolved in sulphuric acid of aminoanthraquinones obtained by nitration of anthraquinone and subsequent reduction of the nitroanthraquinones is separated.

8. A process according to claim 1, wherein the partition in the two phases is carried out continuously.

9. A process according to claim 8, wherein the continuous partition is carried out in a countercurrent.

10. A process according to claim 1, wherein acids of a high degree of purity are used.

* * * * *